United States Patent Office 3,230,641
Patented Jan. 25, 1966

3,230,641
PROGRAMMED INSTRUCTION DEVICES
Jacob Sloves, Forest Hills, N.Y., assignor to Sloves Mechanical Binding Company, Inc., New York, N.Y., a corporation of New York
Filed Feb. 23, 1962, Ser. No. 174,998
3 Claims. (Cl. 35—9)

The present invention relates generally to teaching devices and more particularly to programmed teaching books incorporating a page masker adapted selectively to reveal answers to questions posed in the text.

The programmed teaching technique operates by providing instruction to the student in small increments and obtaining a student response at each step. By this step by step question and answer process, the student knows immediately after he responds whether his solution is correct or in error. It teaches the student at a pace suited to his rate of reading and absorption, for the student controls the time spent on each step.

Teaching devices of the like currently available usually take the form of film projectors operating in conjunction with masking plates which can be manipulated by the student to reveal answers. Devices are also in use in which a bound text is inserted within a covering binder provided with an adjustable page masker, the learner moving the mask down the page to uncover the answers as he goes along.

All existing devices for this purpose are relatively expensive and even in the case where the question and answer material is in a book form which is usually discarded by the student after a single use, the cost of the auxiliary masking equipment has discouraged this wide scale use in public schools and in other institutions.

In view of the foregoing, the main object of this invention is to provide a programmed teaching book which constitutes a self-sufficient and inexpensive teaching device and does not require any auxiliary equipment.

More specifically, the object of the invention is to provide a work book of the above-described type having a transparent jacket bound therein to overlie the text, the jacket including a slidable masking plate or card which may be adjusted to reveal answers to questions presented in the text.

An important advantage of the invention is that the work book may be manufactured at low cost, it is extremely simple to handle and it lends itself to popular use in public schools without the need for special equipment.

Briefly stated, these objects are attained by a book having pages removably bound therein, the pages being printed with a programmed text constituted by questions and answers. Permanently bound into the book and overlying the top page therein is a transparent open-ended sleeve or envelope having a masking card therein which is slidable from a position blocking all of the answers to successive positions uncovering the various answers.

For a better understanding of the invention, as well as other objects and features thereof, reference is had to the following detailed description to be read in conjunction with the accompanying drawing, wherein.

Figures 1, 2, 3, 4, 5:
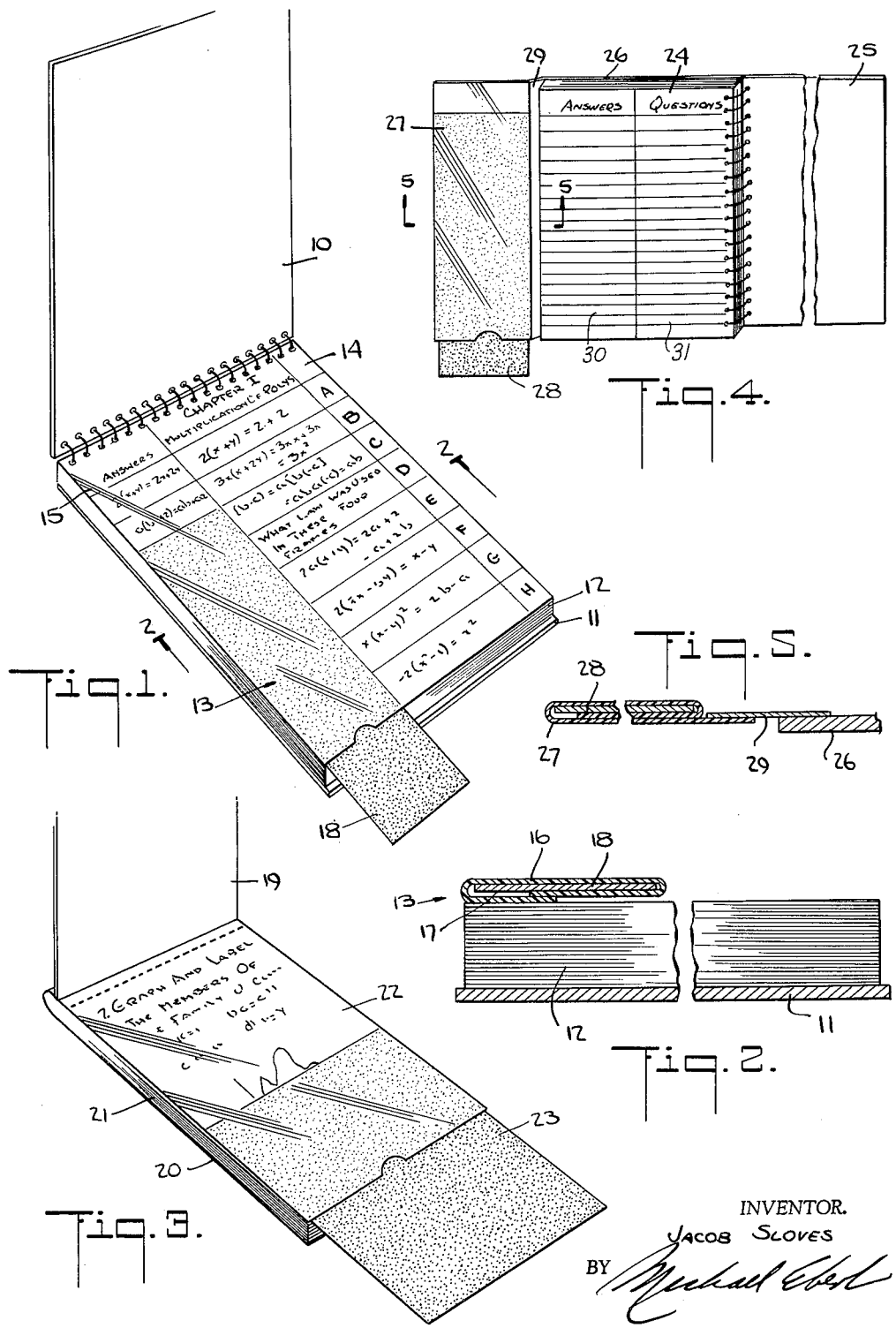
FIG. 1 shows in perspective a preferred embodiment of a teaching book according to the invention.
FIG. 2 is a sectional view taken in the plane indicated by lines 2—2 in FIG. 1.

FIG. 3, in perspective, illustrates another embodiment of the invention.

FIG. 4, in perspective, illustrates still another embodiment, and

FIG. 5 is a section taken in the plane indicated by lines 5—5 in FIG. 4.

Referring now to the drawing and in particular to FIGS. 1 and 2, the programmed teaching manual or book comprises top and bottom covers 10 and 11 within which is spirally bound a plurality of pages 12 as well as a masking jacket, generally designated by numeral 13.

Covers 10 and 11 may be soft or hard and fabricated of any conventional material. The pages 12 are divided by frame lines into a column 14 having a row of different questions A to H printed therein, the questions running down the page on the right side thereof, and an adjacent column 15 down the page on the left side thereof. The pages are of paper and may readily be torn from the book.

The masking jacket 13 has a width matching the width of the answer column and a length equal to the page length, the jacket overlying the answer column on the top page. The jacket includes a sleeve or open-ended envelope formed of a flexible, transparent material, such as Mylar, polyester or cellophane or any other suitable plastic in sheet form. The envelope is provided with a top panel 16 and a bottom panel 17 formed for example by folding a single sheet of material and sealing the end to close the sleeve and to define an open-ended channel between the panels. Alternatively, the envelope may be formed by two separate panels interconnected at the edges by spacer ribs.

Masking element is in the form of an opaque card preferably black, which is receivable within the channel of the envelope and can be withdrawn by the student to expose the answers in sequence. The upper end of the envelope is bound into the book, and since it is composed of plastic rather than paper it cannot be readily torn from the book and remains a permanent part thereof. Thus as pages are removed the masking jacket operates in conjunction with whatever page remains on top. The panels at the lower end of the envelope are thumb notched to facilitate retraction of the mask.

In practice, when the work book is put to use, the mask initially is fully inserted and all answers are concealed. The student proceeds to study and solve problem A, and when his answer is prepared he checks it against the correct answer by pulling down the mask to expose the printed answer corresponding to problem A. This process is repeated until all problems on the page are correctly solved and checked, and the student then removes the page and proceeds to work out the problems on the next page in the same fashion.

The entire book may be manufactured of soft inexpensive paper, and as is evident, it functions as a self-sufficient programmed teaching device, without any need for auxialiary masking equipment.

The book shown in FIG. 3 is of stitched construction and includes covers 19 and 20, and pages 21 perferated at the upper edge to facilitate ready removal. In this case, the question and answers do not appear in adjacent columns in side by side relation, but are printed one below the other. Thus the masking jacket, which includes an open-ended envelope 22 and a masking card 23 slidable therein, is dimensioned to cover the entire page, rather than a column therein. By sliding the mask downwardly, the question is first exposed, and by a further downward shift the answer is then revealed. The basic principle of operation is similar to the embodiment in FIG. 1 but this arrangement is useful where the answer is in the form of a graph which must occupy the full width of the page and cannot be compressed within a narrow column.

In some cases, a reusable work book may be desired, in which event the student does not remove pages but only turns pages. This is accomplished by the book in FIGS. 4 and 5, where the pages 24 are spirally or otherwise bound between top cover 25 and bottom cover 26.

A masking jacket constituted by an envelope 27 and a masking card 28 slidable therein is attached to the edge of the bottom cover 26 by means of a flexible hinge 29, say of canvas, so that when the book is in use, the masking jacket may be folded across the answer column 30 for operation with reference to questions set out in the adjacent question column 31.

While there has been shown what are considered to be preferred embodiments of the invention, it will be obvious that many changes may be made therein without departing from the essential spirit of the invention as set forth in the annexed claims.

What is claimed is:

1. A programmed teaching book comprising a book having paper pages removably bound therein, each page having a printed column of questions and an adjacently printed column of answers, whereby a student after answering the questions appearing on the top page of the book removes same to expose the next unanswered page which then becomes the top page, a masking jacket constituted by a transparent open-ended envelope overlying the answer column on the top page of the book, the upper edge thereof being bound to said book, and a masking card slidably received within said envelope and retractable therefrom through the lower open edge to expose said answers in sequence.

2. A book as set forth in claim 1, wherein said envelope is formed of a flexible transparent plastic and said masking card is of paper.

3. A book as set forth in claim 1, wherein said pages and said envelope are spirally bound together.

References Cited by the Examiner

UNITED STATES PATENTS

| | | | |
|---|---|---|---|
| 1,346,017 | 7/1920 | Goodman | 35—35.5 |
| 1,492,932 | 5/1924 | Orrell | 281—31 X |
| 2,234,075 | 3/1941 | Carolin | 35—48.1 |
| 2,628,435 | 2/1953 | Minninger et al. | 35—35.5 |
| 3,054,195 | 9/1962 | Palmer | 35—9 |

FOREIGN PATENTS 332,119   7/1930   Great Britain.

EUGENE R. CAPOZIO, *Primary Examiner.*

LEO SMILOW, JEROME SCHNALL, *Examiners.*